United States Patent [19]

McFarland et al.

[11] Patent Number: 4,791,653
[45] Date of Patent: Dec. 13, 1988

[54] PSEUDORANDOM WORD SEQUENCE SYNCHRONIZER

[75] Inventors: William J. McFarland, Mountain View; Richard C. Walker, Palo Alto, both of Calif.

[73] Assignee: Hewlett-Packard Company, Palo Alto, Calif.

[21] Appl. No.: 89,291

[22] Filed: Aug. 25, 1987

[51] Int. Cl.$^4$ .............................................. H04L 7/00
[52] U.S. Cl. ................................. 375/115; 375/116; 370/107; 371/47
[58] Field of Search .............. 375/106, 115, 114, 116; 371/42, 46, 47; 370/107

[56] References Cited

U.S. PATENT DOCUMENTS 4,442,527  4/1984  Munday ........................ 375/115 X
4,663,766  5/1987  Bremer ......................... 375/114 X

OTHER PUBLICATIONS

John J. O'Reilly, "The Radio and Electronic Engineer", vol. 45, No. 4, pp. 171–176, Apr. 1975.
I. Rampaigul and J. J. O'Reilly, "Series-Parallel Bit--Error-Ratio Measurement for High Digit Rate Transmission Systems", paper presented at an International Conference on Measurement for Telecommunication, 1985.

Primary Examiner—A. D. Pellinen
Assistant Examiner—Derek S. Jennings
Attorney, Agent, or Firm—John A. Frazzini; Edward Y. Wong

[57] ABSTRACT

A bit-error-rate tester provides for testing of links with different numbers of channels without replacing or reconfiguring an included pseudorandom word sequence (PRWS) generator. The tester includes a transmitter and a receiver, each with generators for parallel evenly staggered pseudorandom bit sequence (PRBS) replicas collectively constituting the PRWS. The receiver generator is a copy of the transmitter generator so that it can predict the PRWS received from the transmitter. Comparators are provided so that incoming and locally generating sequences can be compared to determine bit error rates. Synchronization of the receiver generator is effected using a pattern detector coupled to at least one reception line. When a predetermined pattern is detected, an injector injects registers of the receiver generator with a predetermined bit pattern. Afterwards, the receiver generator autonomously generates its PRWS synchronously with the PRWS received from the transmitting generator. A further embodiment provides for rerouting of crossed transmission channels as well as synchronization. In either case, there is no requirement that all available channels be active to effect synchronization.

5 Claims, 3 Drawing Sheets

FIG. 2

```
           1         2         3         4     TIME
 123456789012345678901234567890123456789012345 6 PATTERN
 ----+----+----+----+----+----+----+----+---*!
 0001101110101000001001011001111100011011010100  TL4
 1010100001001011001111100011011010100001001 01  TL3
 0100101100111110001101101010000100101100111 1   TL2
 0011110001101110101010000100101100111110001101 1 TL1

001101110101000010010110011111000110110101 01000 TF0
```

PSEUDORANDOM WORD SEQUENCE SYNCHRONIZER

BACKGROUND OF THE INVENTION

The present invention relates to digital communications and, more particularly, to a synchronizer for a bit-error-rate tester.

A major objective of the present invention is to provide a bit-error-rate (BER) tester for testing communications links with different numbers of parallel lines. The main challenge proves to be developing a synchronizer for such a BER tester which is effective for all possible numbers of parallel lines being tested concurrently, up to the capacity of the tester.

A bit-error-rate tester can comprise a transmitter and a receiver, each with respective pseudorandom sequence generators. The receiver generator typically replicates the transmitter generator so as to be able to "predict" sequences received from it. The receiver generally includes comparators for comparing locally generated sequences with sequences received from the transmitter, so that the latter can be evaluated for errors. Preferably, each transmitted sequence is a pseudorandom bit sequence (PRBS).

A PRBS is a periodic binary sequence that shares the favorable statistical properties of true random number sequences needed for many simulation and testing approaches. For example, in a PRBS of order N, each possible N-bit binary sequence, other than a string of all zeroes, is represented in each cycle of the PRBS. This makes PRBS's useful in testing a system's performance under all possible input conditions.

A PRBS can be generated by a shift register with a feedback loop including a single exclusive-OR (XOR) gate. A shift register N-bits long suffices to generates a PRBS of order N and length $L=2^n-1$. To maximize the generation rate of a PRBS, a number W of evenly staggered replicas of a single PRBS can be generated and then multiplexed to form the original PRBS at W times the bit rate of the individual streams. A generator with N parallel latches and W XOR gates suffices to generate W evenly staggered replicas of a PRBS sequence of order N, as suggested by John J. O'Reilly, "The Radio and Electronic Engineer", Vol. 45, No. 4, pp. 171-176, April 1975.

Traditionally, parallel PRBS have been generated to provide faster single PRBS. However, they can also be used to test parallel communications links and devices, such as multiplexers, with parallel inputs. In such applications, the parallel PRBS so generated constitute a pseudorandom word sequence (PRWS).

Synchronizers for serial PRBS transmissions are well known. For example, a received PRBS stream can be injected to fill a shift register, the feedback loop of which can then be closed so that the synchronizer can autonomously and synchronously generate the same PRBS sequence. A PRWS synchronizer can be synchronized by loading a one bit wide parallel word into a parallel latoh. See I. Rampaigul and J.J. O'Reilly, "Series-Parallel Bit-Error-Ratio Measurement For High Digit Rate Transmission Systems", paper presented at an International Conferenoe on Measurement for Telecommunication, 1985.

A bit error rate tester using the synchronization scheme with parallel latches is limited to fixed-word-width transmission. For example, if the generator is designed for a W-bit wide Nth order transmission, synchronization would only be possible where transmission was effected over W channels. The disadvantage is that the generator would have to be replaced or reconfigured each time a different number of parallel lines were to be tested.

Another problem with available parallel synchronizers is their inability to synchronize when the communications channels are crossed. This might occur in testing a demultiplexer. Alternatively, someone might simply select the wrong cable in completing a communications link.

It would be cost effective and practical to be able to use a single generator in a bit-error-rate tester and give the synchronizer the ability to synchronize irrespective of the number of communications channels being tested, up to the capacity of the generator to generate different-phased replicas of a given PRBS. In addition, it is desirable to be able to effect synchronization even where the parallel channels of a communications link are crossed. Accordingly, it is an object of the present invention to provide such a synchronizer.

SUMMARY OF THE INVENTION

The foregoing and other objectives are achieved by a synchronizer including a pattern processor and an injector. The injector injects a predetermined or calculated bit pattern into a PRWS generator of a receiver to synchronize it with an incoming PRWS sequence received by an incorporating receiver. The timing of the injector is determined by the pattern processor which is arranged to respond to bit patterns in one or more of parallel reoeption lines.

In one realization of the present invention, the pattern processor includes a resettable N-bit counter, where N is the order of the characterizing polynomial for the PRBS constituting the PRWS. The counter is arranged to receive a PRBS along one of the reception lines so as to detect a pattern of N 1s, which pattern occurs exactly once each PRBS cycle. The counter counts up each time a 1 is encountered and resets itself each time a 0 is encountered. The counter counts to N once each PRBS cycle, i.e., when the pattern of N 1s occurs. On this count, the counter outputs an injection signal.

This signal triggers the injection of the $N \times 1$ bit word of the PRWS following this pattern in the PRBS into the parallel latches of the receiver's generator. The feedback loop for the generator is then closed so that the generator can run autonomously and synchronously with the received PRWS. An advantage of this relatively simple approach is that the receiving generator can always be synchronized irrespective of the number, between 1 and W, of channels actually transmitting, where W is the maximum number of evenly staggered PRBS replicas the receiver generator can produce.

In another realization of the present invention, the pattern processor is coupled to all receiving lines so as to determine the relative phases of the received PRBS sequences. This determination can be used to identify any channels that may have become crossed or rotated in transmission. The pattern processor can then signal the user to swap lines or control a cross connect array to match incoming and locally generated PRBS replicas.

With some sacrifice of simplicity and economy relative to the first realization, the latter realization provides synchronization irrespective of the lines used for reception and any potential channel crossing. However, where less than all available channels are used, full determination of the matching of incoming and local sequences can require additional information. Thus, means may be provided for informing the pattern processor of the phase of a sequence received on a specified line relative to the complete PRWS, and/or, for informing the pattern processor of the relative phases of the sequences selected for transmission.

In either realization, the present invention can provide a bit-error-rate tester by coupling each incoming and corresponding locally generated PRBS sequences to respective inputs of a comparator. Such a bit-error-rate tester is more flexible than prior art devices in that synchronization can be effected for any number of channels, between 1 and W, being used without replacing or reconfiguring generators. Enhanced flexibility is also provided to determine and correct for channel crossing and rotation. Further features and advantages of the present invention are apparent from the description below with reference to the following drawings.

BRIEF DESCRIPTION OF THE DRAWINGS

FIG. 2 is a word sequence diagram of the output of a transmitter generator of the communication system of FIG. 1.

DESCRIPTION OF THE PREFERRED EMBODIMENTS

Figure 1:
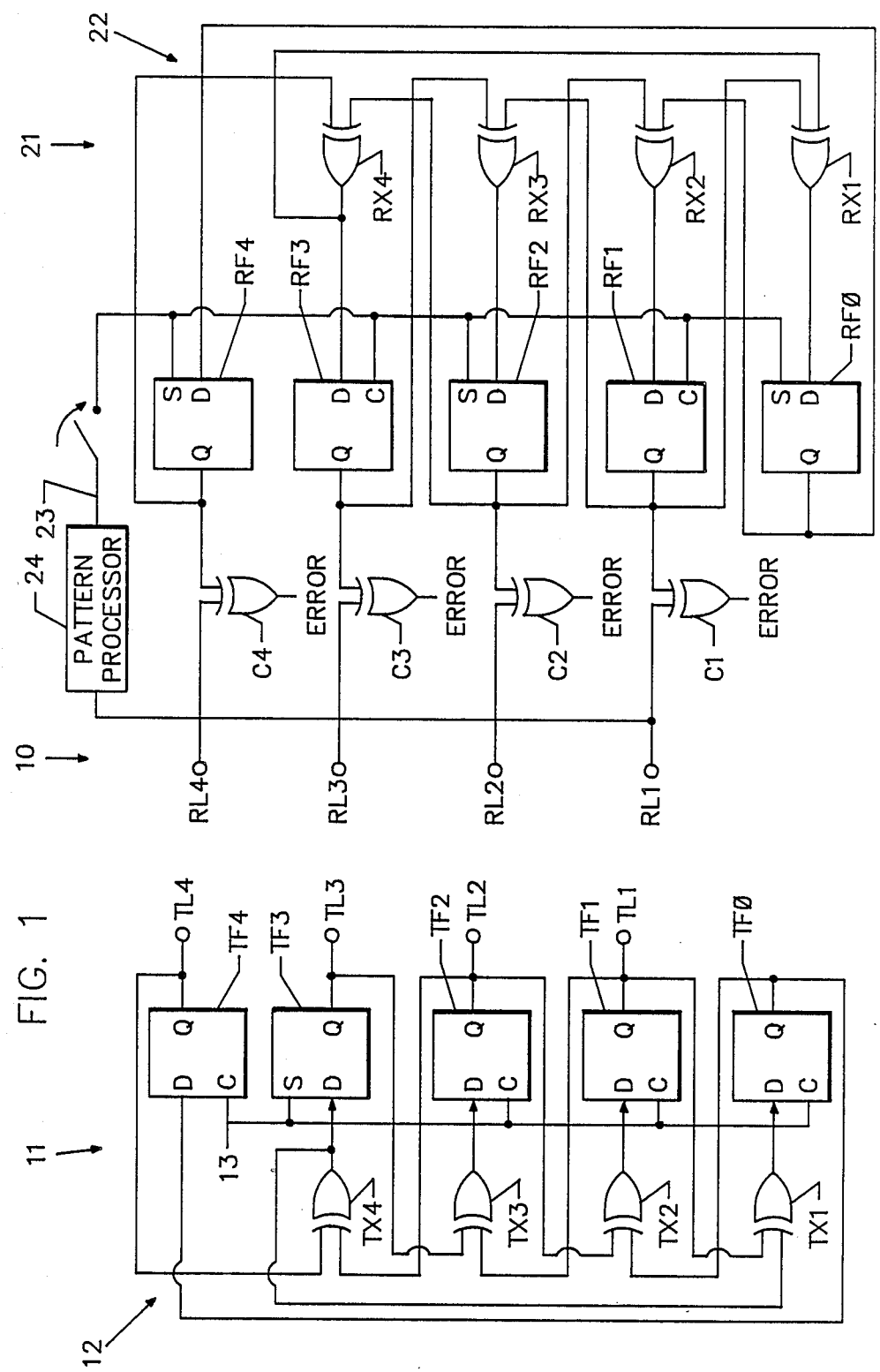
FIG. 1 is a schematic diagram of a bit-error-rate tester incorporating a synchronizer for a pseudorandom word generator in accordance with the present invention.

A bit error rate tester 10 includes a transmitter 11 and a receiver 21, as shown in FIG. 1. Transmitter 11 includes a transmitter generator 12 and parallel transmission lines TL1-TL4. Receiver 21 includes a receiver generator 22 and reception lines RL1-RL4, essentially identical to the corresponding components of transmitter 11. Transmitter 11 includes a start line 13, while receiver 21 includes an injector 23. Receiver 21 also includes four comparators C1-C4 in the form of XOR gates conventionally used with bit-error-rate testers. A pattern processor 24, in the form of a resettable counter, provides for a novel method of synchronizing bit-error-rate tester 10.

Transmitter generator 11 comprises five flip-flop registers TFO-TF4 arranged as parallel latches and four XOR gates TX1-TX4 arranged in feedback relation with the registers. Transmitter generator 11 generates a PRWS, illustrated in FIG. 2, comprising four evenly staggered replicas of a single PRBS identified by their respective transmission lines TL1-TL4. A fifth PRBS replica, identified by register RFO that generates it, shown separately in FIG. 2, is not available for transmission.

Figure 3:
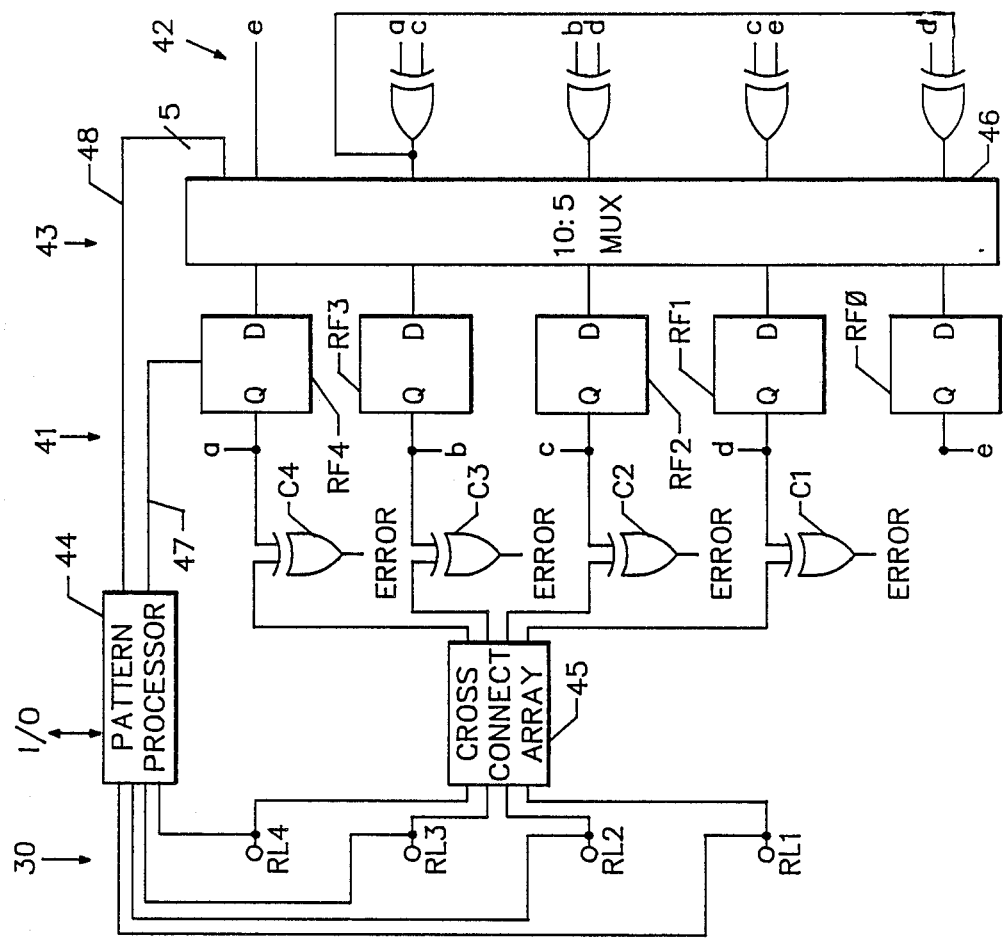
FIG. 3 is a schematic diagram of another bit-error-rate tester incorporating another synchronizer in accordance with the present invention.
Figure 3:
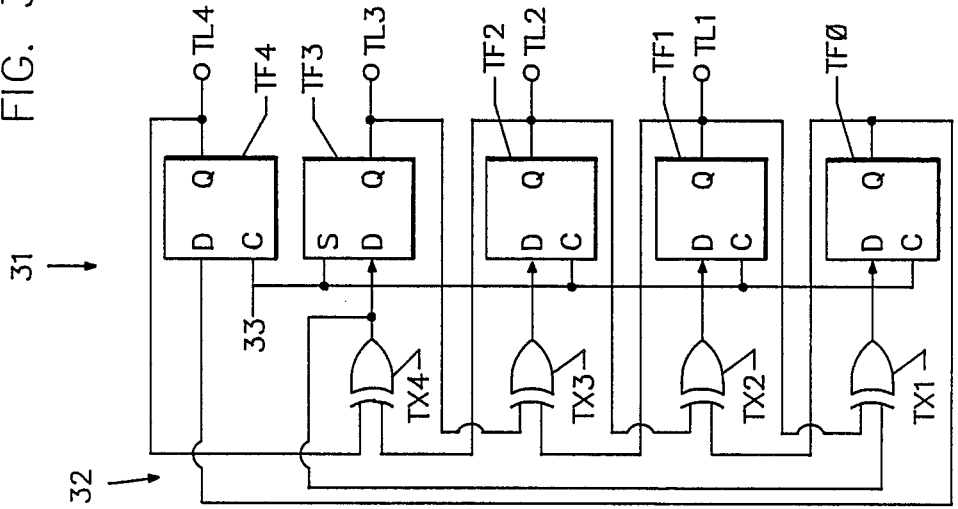

Initialization of transmitter generator 11 is effected by activating start line 13, which sets register TF3 to logic one by activating its set input S, while clearing the remaining registers to logic zero by activating their respective clear inputs C. This initializes receiver generator 12 with the 5×1 word 01000, as indicated at time bit 1 of FIG. 2. The five bit words of FIG. 2 indicated at RLO and TL1-TL4 are generated over successive clock cycles. Flip-flop registers RLO-RL4 and all other components represented by boxes in FIGS. 1 and 3 are driven at implied clock inputs. The bits generated by registers TF1-TF4 can be transmitted along transmission lines TL1-TL4 respectively.

The number N of registers used in a transmitter generator is also the order of the polynomial for the generated PRBS; the cycle length of the PRBS is $2^n - 1$. The cycle length of the PRBS of FIG. 2 is $2^5 - 1 = 31$. In generators of the parallel latch design, the number W of XOR gates TX1-TX4 represents the number of available evenly staggered outputs. In this case the number of available outputs is W=4.

When properly synchronized, BER receiver 21 receives the PRWS transmitted by transmitter generator 12 at reception lines RL1-RL4; normally RL1 receives the transmission from TL1, RL2 from TL2, and so on. Comparator C1 receives corresponding remotely and locally generated sequences at its inputs. Ideally, the inputs are always the same and comparator C1 maintains a logic low output. However, an error reflected in the received sequence will show up as a logic high output from comparator C1, which can be used in computing a bit error rate for communications channel TL1-RL1. Bit error rates for the remaining channels can be determined by the outputs of the remaining comparators C2-C4.

Receiver generator 22 is able to "predict" the PRWS that should be received from transmitter generator 12 because it is essentially identical to transmitter generator 12. Receiver generator 22 includes registers RFO-RF4 and XOR gates RX1-RX4 arranged in the same configuration as the corresponding components in transmitter generator 12.

Synchronization is effected in a novel manner as follows. Pattern processor 24, coupled to reception line RL1, is basically a resettable 5-bit counter. When activated, pattern processor 24 counts up each time a 1 is received along reception line RL1, and resets itself each time a 0 is detected. When five consecutive 1s are detected, pattern processor 25 generates an injection signal, activating injector 23 which initializes receiver generator 22 with a predetermined bit pattern.

The chosen 11111 pattern extends between time bits 3-7, as shown in FIG. 2. Thus, the pattern is detected at time bit 7. This triggers injector 23 to initialize receiver registers RFO-RF4 ith the word pattern 10101, the five-bit word at time bit 8 of FIG. 2, effecting synchronization.

Note that this synchronization scheme is dependent only on the proper linkage of TL1 and RL1. The other lines can be crossed or unused, and synchronization can be achieved. Thus, BER tester 10 permits testing of any number W=4 of parallel channels up to the number of available channels. The embodiment of FIG. 1 is directly scalable to larger Ns and Ws. As long as a proper connection is made on the line with the pattern processor, synchronization is achievable, even where fewer than W channels are transmitting.

The principles of the foregoing embodiment are extended in a BER tester 30 comprising a transmitter 31 identical to transmitter 11 of FIG. 1, and a receiver 41 differing from receiver 21 in having a more sophisticated pattern processor 44 and adding a cross connect array 45. This BER tester 30 can provide, in addition to synchronization, proper rerouting of reception lines RL1-RL4 to comparators C1-C4 so that, for example, comparator C1 indicates the bit error rate for transmission line TL1 no matter how the channels are crossed between transmission and reception. Receiver 41 is otherwise identical to receiver 21 of FIG. 1, incorporating an identical generator 22, and similar injector 23. The remaining identical components retain the referents used in FIG. 1.

The preferred mode of operation for BER receiver 41 is illustrated by the following steps. An initialization step establishes one communications link between transmitter 31 and receiver 41. For example. transmission line TL1 transmits an identifying repeating 5-bit pattern 00001; if TL2 were used instead the pattern would be 00011. Pattern processor 44 detects the 00001 pattern on reception channel RL2, establishing that RL2 is linked to TL1.

PRWS transmission is then started on all W=4 channels. Pattern processor 44 detects the next 11111 pattern at time bit 7 on, for example, reception line RL2 determining a channel between TL1 and RL2. The time of this pattern detection determines the synchronization for the entire PRWS. However, reception lines RL1, RL3 and RL4 must still be matched correctly with TL2, TL3 and TL4.

Next, pattern processor 44 looks for the next 11111 pattern to appear on any of the remaining reception lines R1, R3 and R4. Eight bits latter, at time bit 15, it finds the 11111 pattern in reception line RL3, establishing its linkage with TL2. At time bit 23, eight bits latter, pattern processor 44 finds another 11111 pattern in channel RL4, which is thus linked with TL3, implying a channel between TL4 and RL1.

Pattern processor 44 uses these matches to configure cross connect array 45. RL1 is routed to the respective input of comparator C4, RL2 is routed to C1, RL3 to C2 and R4 to C3. Then, synchronization is effected by actuating injector 43 after the next 11111 pattern is found on RL2, e.g., at time bit 39. Synchronization is effected and each comparator C1-C4 provides data reflecting the bit-error rate of the like-numbered transmission channel TL1-TL4.

Injector 43 includes a 10:5 multiplexer 46. Once receiver generator 42 is synchronized, multiplexer 46 provides "straight-through" connection of the inputs to registers RFO-RF4, so that the connections follow those for transmitter generator 31. When pattern processor 44 outputs an injection signal along line 47, the data from pattern processor 44 provided along 5-bit bus 48 is input to the registers RFO-RF4 for one clock cycle. In the present case, the pattern is 10101. However, in other modes of operation, pattern processor 44 has the flexibility to select any data pattern for injection into the registers RFO-RF4.

Determinations of the desired cross connection for array 45 depends only on knowledge of the phase relations of the sequences being transmitted and is independent of the number of channels actually used. If this is not known to start with, it can be established once the transmission line and reception line corresponding to at least one transmission channel is known, either through the foregoing initialization procedure applied to one of the transmitting lines or other means. Thus, complete synchronization and proper cross connection can be effected for any set of channels employed for transmission.

The inputs and outputs for the pattern processor and the injection pattern can be generalized by those skilled in the art for any PRWS. The selection and programming of the required hardware is then straightforward.

The cross connect array need not be located between the receiver coupling to the pattern processor and the receiver coupling to the comparators. The cross connect array can be arranged in front of the pattern processor couplings or between the register outputs and the comparators. In the latter case, the correspondence between comparators and transmission lines must be changed. Alternatively, a pair of cross connect arrays can be incorporated in the generator, one between the register outputs and the XOR gate inputs, and one between the XOR gate outputs and the register inputs. Other means can be employed to obtain correspondence of the received and locally generated sequences.

The pattern processor can be used without a cross connect array. In this case the pattern processor simply provides cross connect information to a user. The user can then reconnect to effect a predetermined correspondence, e.g., TL1 to RL1, TL2 to RL2, etc.

The described initialization routine is not required for synchronization. It is useful for proper cross connection where fewer than all W available lines are used in transmission. However, other information can suffice to effect cross connection in applications where that is desired.

Cross connection can be completely determined where the relative phases of all used transmission lines are known. The relative phases are known if the transmission lines or registers providing the transmitted sequences are known. Accordingly, if transmission lines TL2 and TL4 are used, the received sequences can be properly routed to C2 and C4, irrespective of what reception lines are used. Of course, the pattern processor must be programmed and informed through the illustrated interface port I/O, for example, that TL2 and TL4 are the sources of the sequences. The desired cross connections are effected as follows.

In the absence of the initialization routine, the pattern processor 44 can begin looking at all used channels for a 11111 pattern. Upon detection, it looks for a 11111 pattern in another channel. Upon this second and succeeding 11111 pattern detections, the number of bits between the present and the preceding pattern detection are determined The detections can continue until at least one odd spacing, e.g., 7, 15 or 23 bits, is detected.

The reception line in which the odd detection is made corresponds to the lowest-numbered active transmission line. If TL1 is transmitting, the pattern is from TL1, if TL1 is not transmitting but TL2 is, the pattern is from TL2, and so on. If TL2 is the lowest transmitting line and the odd 11111 pattern appears on RL3, then the TL2-RL3 link is established. As demonstrated above with respect to the method employing an initialization signal, the establishment of one link is sufficient to allow the pattern processor to determine the relative phases and cross connections for the remaining links.

In the illustrated embodiments, the pattern detected was a string of all one's. Generally, any N-bit pattern can be used, other than N-zeroes, since that pattern is excluded from a PRBS. Since a PRBS is a fixed sequence, determination of the phase of any non-zero N-bit pattern determines the phase of all other N-bit patterns in the sequence. Thus, the same information can be obtained using any pattern for detection. Note that a single counter can provide the necessary pattern detection capability for an entire system provided there is also means for switching the counter from one reception line to another as patterns are detected.

The pattern processor is not required to search for a predetermined pattern. The pattern processor can simply examine the contents of any N-bit sample over parallel reception lines. These contents together with the identification of a single link, either through initialization, knowledge of which transmission channels are employed or other means completely determine the correspondence between transmitting and receiving channels irrespective of crossing and rotation of communications links. If it is important to synchronize quickly, and processing power is not a constraint, one can simple sample the first valid N-bit long word and effect synchronization and proper cross connection.

The samples need not comprise consecutive bits. Most clearly, a sample can comprise N bits successively spaced $2^n$ bits apart. This yields the same information as a sample of N consecutive bits, so the same conclusions can be obtained. However, other spacings can be used in defining non-consecutive bit samples.

It is apparent that the present invention applies irrespective of the actual transmitting hardware used to generate a given PRWS. Considerable flexibility is provided for receiver generators, while the injector must be adapted to the type of receiver generator employed. In the illustrated embodiments, the injector simply injects a predetermined sequence when actuated. Alternatively, an injector could accept an injection pattern calculated by the pattern processor, for example, on the basis of the contents of an arbitrarily captured N-bit long PRWS sample. These and other modifications and variations are provided by the present invention, the scope of which is limited only by the following claims.

What is claimed is:

1. A system comprising:
   receiver means for receiving binary sequences along parallel channels;
   a pseudorandom word generator for generating pseudorandom word sequences, said generator including plural registers, said generator having a characterizing polynomial;
   a pattern processor for providing an injection signal as a function of a pattern received by said receiver means, said pattern processor being coupled to said receiver means; and
   injector means for injecting a bit pattern into said registers in response to said injection signal so that when an incoming pseudorandom word sequence having the same characterizing polynomial as said generator is received by said receiver means, said pseudorandom word generator is synchronized with said incoming pseudorandom word sequence.

2. The system of claim 1 wherein said characterizing polynomial is of order N, said pattern processor including a resettable N-bit counter coupled to receive a bit sequence along one of said channels.

3. The system of claim 2 wherein said generator includes N registers, said injector means presetting each register to a predetermined logic value in response to said injection signal.

4. The system of claim 1 wherein said generator has a characterizing polynomial of order N and provides W evenly staggered replicas of a pseudorandom bit sequence, said pattern processor being coupled to at most W channels of said receiving means so as to determine the relative phases of replicas of said pseudorandom bit sequence received along said channels, said pattern processor providing a cross connect signal as a function of said relative phase determination.

5. The system of claim 4 further comprising cross connect means for matching the relative phases of pseudorandom bit sequences received along said channels with the phases of pseudorandom bit sequences generated by said generator, said cross connect means being coupled to at least one of said generator and said receiver means, said cross connect means being coupled to receive said cross connect signal provided by said pattern processor.

* * * * *